United States Patent
Rusch et al.

(10) Patent No.: US 7,392,236 B2
(45) Date of Patent: Jun. 24, 2008

(54) METHOD, COMPUTER PROGRAM PRODUCT AND COMPUTER SYSTEM FOR A SINGLE DATABASE SYSTEM TO SUPPORT MULTIPLE APPLICATION SYSTEMS

(75) Inventors: Gert Rusch, Eppelheim (DE); Thomas Raupp, Karlsdorf (DE); Ulrich Marquard, Bad Schönborn (DE); Uwe Inhoff, Leimen (DE)

(73) Assignee: SAP AG, Walldorf (DE)

( * ) Notice: Subject to any disclaimer, the term of this patent is extended or adjusted under 35 U.S.C. 154(b) by 712 days.

(21) Appl. No.: 09/989,070

(22) Filed: Nov. 21, 2001

(65) Prior Publication Data

US 2002/0174097 A1 Nov. 21, 2002

(30) Foreign Application Priority Data

Mar. 20, 2001 (DE) ................................ 101 13 577

(51) Int. Cl.
*G06F 17/30* (2006.01)
*G06F 12/00* (2006.01)
(52) U.S. Cl. ............................. 707/2; 711/147; 711/153
(58) Field of Classification Search ................ 707/1–3, 707/10, 100, 200; 711/100, 147, 148, 153, 711/170, 173; 709/212, 213, 214, 215, 216
See application file for complete search history.

(56) References Cited

U.S. PATENT DOCUMENTS 5,638,527 A * 6/1997 Parks et al. ................. 711/202
5,897,635 A * 4/1999 Torres et al. .................. 707/10
5,898,883 A * 4/1999 Fujii et al. ..................... 712/28
6,272,612 B1 * 8/2001 Bordaz et al. ............... 711/203
6,477,591 B1 * 11/2002 VanderSpek ................. 710/38
6,502,108 B1 * 12/2002 Day et al. .................... 707/203
6,549,921 B1 * 4/2003 Ofek .......................... 707/204
6,598,174 B1 * 7/2003 Parks et al. .................... 714/6

FOREIGN PATENT DOCUMENTS

WO WO 99/12099 3/1999

OTHER PUBLICATIONS

Anonymous, "Introduction to the Oracle Server," http://1bdwww.epfl.ch/f/teaching/courses/oracle8i/server.815/a67781/c01intro.htm, pp. 1-44, XP002381201, Feb. 1999.
Anonymous, "Oracle8i Parallel Server," http://www.uriit.ru/japan/Our_Resources/Doc_Oracle8i/paraserv.816/a76968/title.htm, pp. 1-47, XP-002275984, Dec. 1999.

* cited by examiner

*Primary Examiner*—Uyen Le
(74) *Attorney, Agent, or Firm*—Finnegan, Henderson, Farabow, Garrett and Dunner LLP (57) ABSTRACT

The invention allows multiple application systems to use a single database system. The database system is divided into at least a first memory portion and a second memory portion. The memory portions are disjunctive. The database system stores a first assignment of a first profile to the first memory portion and a second assignment of a second profile to the second memory portion. The first and second profiles are unique and refer to the first and second application systems, respectively. The first application system and the second application system access the first memory portion and the second memory portion, through the respective profiles.

15 Claims, 7 Drawing Sheets

METHOD, COMPUTER PROGRAM PRODUCT AND COMPUTER SYSTEM FOR A SINGLE DATABASE SYSTEM TO SUPPORT MULTIPLE APPLICATION SYSTEMS

FIELD OF THE INVENTION

The present invention generally relates to database systems for application systems, and more particularly, relates to methods, computer program products and systems for improving the efficiency of database management in a multi-application system landscape.

BACKGROUND OF THE INVENTION

In the past decade, many organizations implemented Enterprise Resource Planning (ERP) software to have an integrated, single software solution on which they could run their business. Client-server technology that was first introduced by the SAP R/3 ERP software became the de facto industry standard for business application software. Client-server technology separates the client (front end) from the application server that is running the application software. Further, the application server is separated from a database server that is running the database software. The database holds all data that are relevant to the application software. The high scalability of this multi-tier approach allowed huge numbers of users in an organization to work simultaneously in the same application system because the load of the system could be better balanced between application servers and database servers compared to systems where applications were run on the data base server.

Driven by the Internet and the idea to optimize business processes not only inside organizations, but also across organizations, many new business software applications were developed to complement the inner-organizational ERP application software. These additional software applications were designed to enable business processes across companies. Examples are Customer Relationship Management (CRM) applications to improve the management of customer relationships and Supply Chain Management (SCM) applications to improve logistics between companies and supplier relationships. However, this approach results in multiple, different and distributed software packages and increases the complexity of system landscapes in organizations.

The typical landscape of today consists of distributed systems with different software applications and separate servers. Each system requires its own database on its own physical hardware. The reasons for this are hardware and software related. For example, most symmetric multiprocessor (SMP) systems were limited to less than 16 processors and less than 4 GB of shared main memory. Operating systems did not offer the feature of creating multiple logical partitions for groups of processors. Databases only allowed for a maximum number of manageable tables (e.g. 10000).

Figure 1:
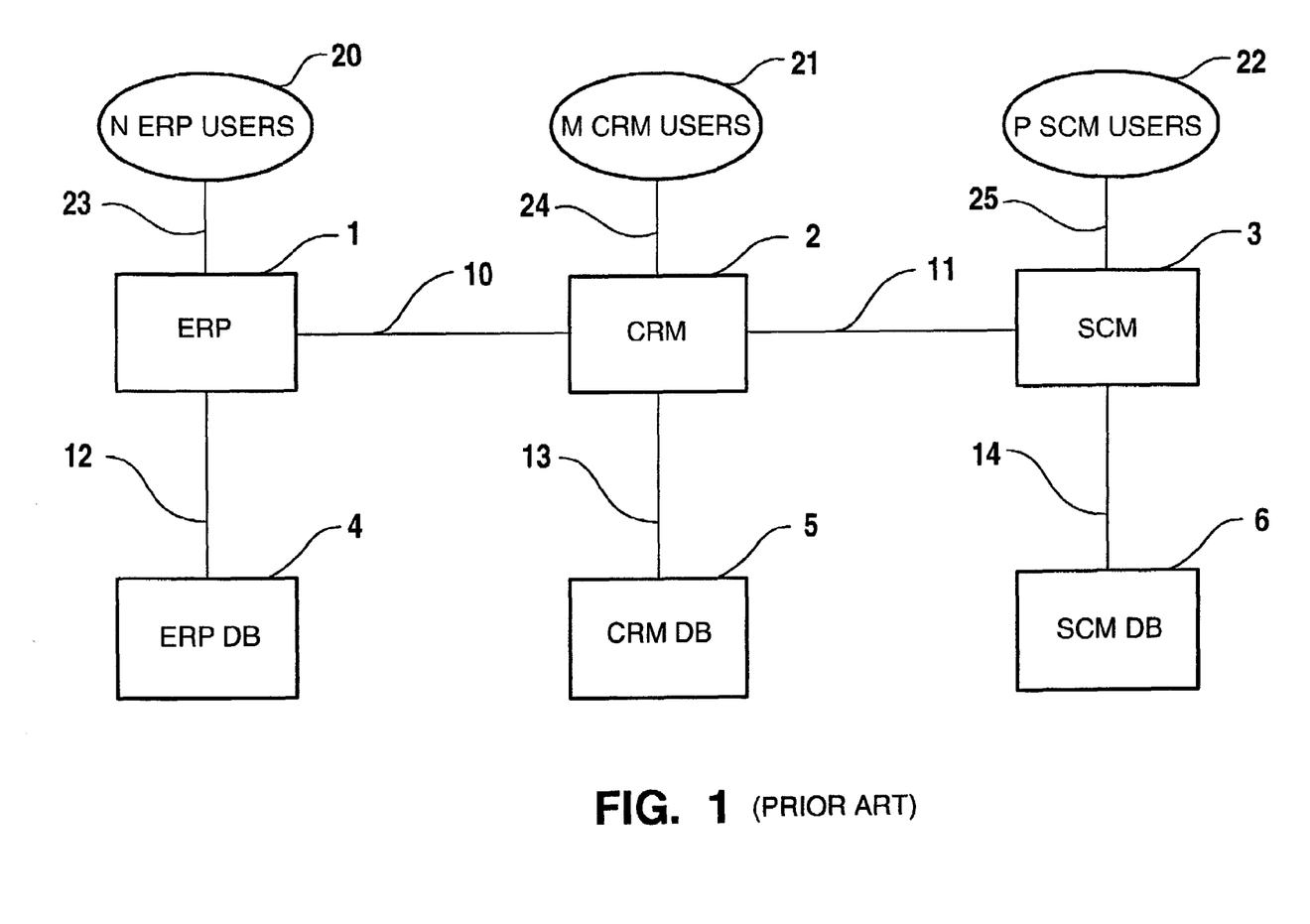
FIG. 1 illustrates an example of an organization's computer system landscape of the prior art.

FIG. 1 illustrates an example of an organization's computer system landscape of the prior art. The application systems ERP 1, CRM 2 and SCM 3 are connected through a network. The network is a local area network (LAN) or a wide area network or any other network known in the art and comprises the branches 10 and 11. Each of the application systems requires its own database system (DB) with the corresponding application data, for example, ERP DB 4, CRM DB 5 and SCM DB 6. Each database system 4-6 is connected to the corresponding application system 1-3 via network branches 12-14. Each application system 1-3 provides application services to pluralities 20-22 of application users. Multiple application users of each of the pluralities can be assigned to a single person. All application users of the pluralities can connect 23-25 to the corresponding application system 1-3 through, for example, a browser based front end computer (not shown) via the network. The system of the prior art, therefore, implies the need of providing three database server computers as well as the need of administrating (backup, tune, manage) these three different database systems.

Further, in case of a total or partial system break-down it is very difficult to have a consistent backup of all database systems. This is critical, because the different application software applications exchange data. For example: an order gets created by a sales person using an internet sales application in the CRM system 2. Then, the order is transferred into the order fulfillment application of the ERP system 1. The SCM system 3 analyzes the order for availability by using the available-to-promise application and finally an analytical application system for simulations (not shown) creates a forecast for the order. Therefore, a full and consistent point-in-time recovery of all databases in the system landscape is desired to guarantee data integrity of all business application data.

SUMMARY OF THE INVENTION

The present invention provides system, method and computer program product for providing multiple business software applications to users with significantly less hardware and less system administration effort by running multiple, independent and different software applications in connection with a single database system. Only one physical database server is needed for n applications, whereas in the prior art systems n physical database servers were required. Therefore, only one database system has to be administrated (e.g. daily backup, database tuning, security administration). Thus, the present invention lowers the cost of ownership for the application systems of an organization. As used herein, the term "database system" is intended to comprise (i) means to store data and (ii) means to retrieve the data.

Storing means are, for example, tables or areas. A retrieving means is, for example, a database operating system. Database systems are commercially available. Database systems are sometimes referred to as "database management systems" (DBMS). Preferably, the database system is a relational database system.

Preferably, application systems and database systems communicate by predefined statements in a predefined database description language. Such languages are well known in the art: an example is structured query language (SQL).

The technical restrictions leading to the multi-database system paradigm in the prior art have been resolved. The present invention takes advantage of a high performance database system having the following characteristics:

a) proven scalability of 32- or 64-processor SMP servers (e.g. HP Superdom; Compaq Alpha);

b) operating system that supports 32- or 64-processor SMP servers (e.g. HP-UX, Tru64);

c) support for 64-bit technology in the operating systems of SMP servers, thus enabling to address more than 4 GigaByte of main memory;

d) relational database management system (RDBMS) that supports database servers with 64 processors, thus enabling high performance for running multiple application systems in connection with one database system;

e) RDBMS that support more than 50,000 different tables in one database thus enabling the management multiple application data on one database.

Further, the present invention solves the technical problem that one database system of the prior art was not able to store application data of multiple application systems that use the database system simultaneously. The computer system and the method described herein allow multiple application systems to use the same physical database system simultaneously. This is achieved through the ability of the data base system to support multiple profiles (different types of database users), through the assigned profile. All memory portions of the database system are disjunctive and, therefore, consistently hold all application related data from the different application systems. The corresponding database software is described as a computer program product herein and the corresponding client software for the application systems is described herein. The corresponding data structure is also described herein.

A further advantage of the single database architecture of the present invention is the possibility of upgrading an application system without the interruption of running applications of other application systems that use the same data base system. For example, a person of skill in the art can achieve this by replicating the shared program parts of the database software, to each database profile.

Further, the present invention solves the technical problem that, in the prior art, a full, consistent point-in-time recovery of multiple application systems in a network was not possible in case of a total of partial break-down of these systems. According to the present invention all application systems use the same database system. This guarantees the integrity of all application data stored in this database system. In case of a backup of the database system the data of all application systems are consistently back-upped. A backup can be performed on-line by continuously writing deltas of the application data to a backup database system, or it can be performed off-line as a system copy when the database system is down. The on-line backup is used for the consistent point-in-time recovery, whereas the off-line backup can be used as a basis for further system implementations within an organization.

Further, the present invention provides a solution to the technical problem of inadequate load balance of the database system caused by simultaneous access of multiple application systems. Improving the load balance is achieved by using multiple application systems in combination with a single database system, where the database system uses an operating system, which comprises the feature of creating multiple logical groups of processors in a SMP system. For example, when the highest database load originates from an ERP system, a possible configuration would be to assign 24 processors to the ERP system, 16 processors to the CRM system and only 8 processors to the SCM system, if the database server uses shared memory (SMP) and comprises at least 48 processors. A person of skill in the art can further increase the scalability of the database system through the usage of parallel database servers, by blending separate machines into a single large virtual database server wfth a shared cache memory.

DETAILED DESCRIPTION OF A PREFERRED EMBODIMENT

For convenience, a list of reference numbers of provided prior to the claims.

Figure 2:
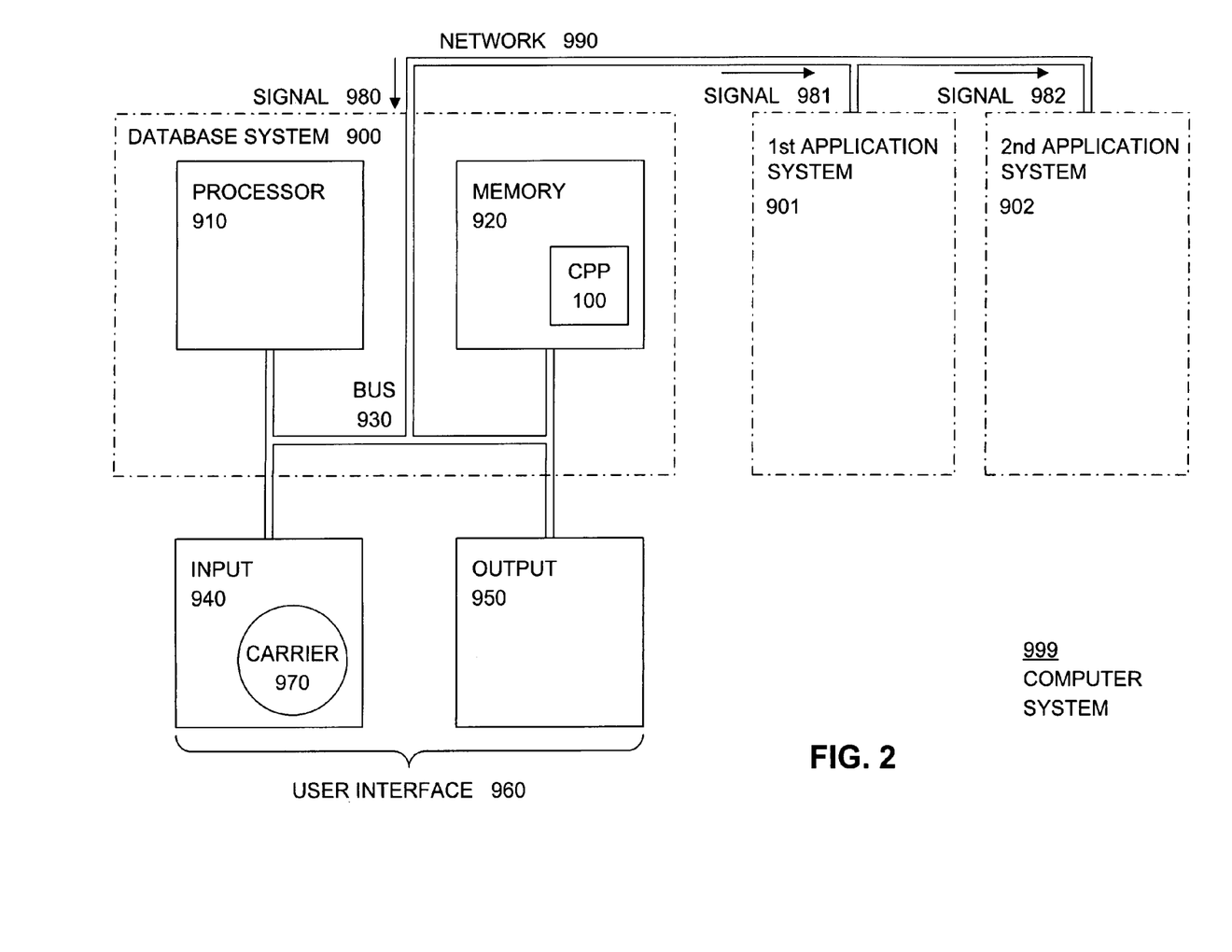
FIG. 2 illustrates a preferred embodiment of a computer system with multiple application systems operating on the same database system according to the present invention.

FIG. 2 illustrates a preferred embodiment of computer system 999 with multiple application computer systems (901, 902) operating on the same database computer system (900) according to the present invention. The inventive computer network system 999 comprises a plurality of computers 900, 901, 901 (or 90$q$, with $q=0 \ldots Q-1$, Q any number).

Computers 900-902 are coupled via inter-computer network 990. Database computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for q=0) in computers 90$q$.

Computer 900 is, for example, a conventional database server computer in the form of a multiprocessor computer, a mainframe computer, a portable or stationary personal computer, or the like.

Processor 910 stands for at least one processor, such as, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, such as, for example, a hard disk, a floppy disk, or other magnetic disk, a tape, a cassette tape; (b) optical media, such as, for example, optical disk (CD-ROM, digital versatile disk - DVD); (c) semiconductor media, such as, for example, DRAM, SRAM, EPROM, EEPROM, memory stick, or by any other media, such as, for example, paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps 430 to 450 of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900-902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the Internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 3:
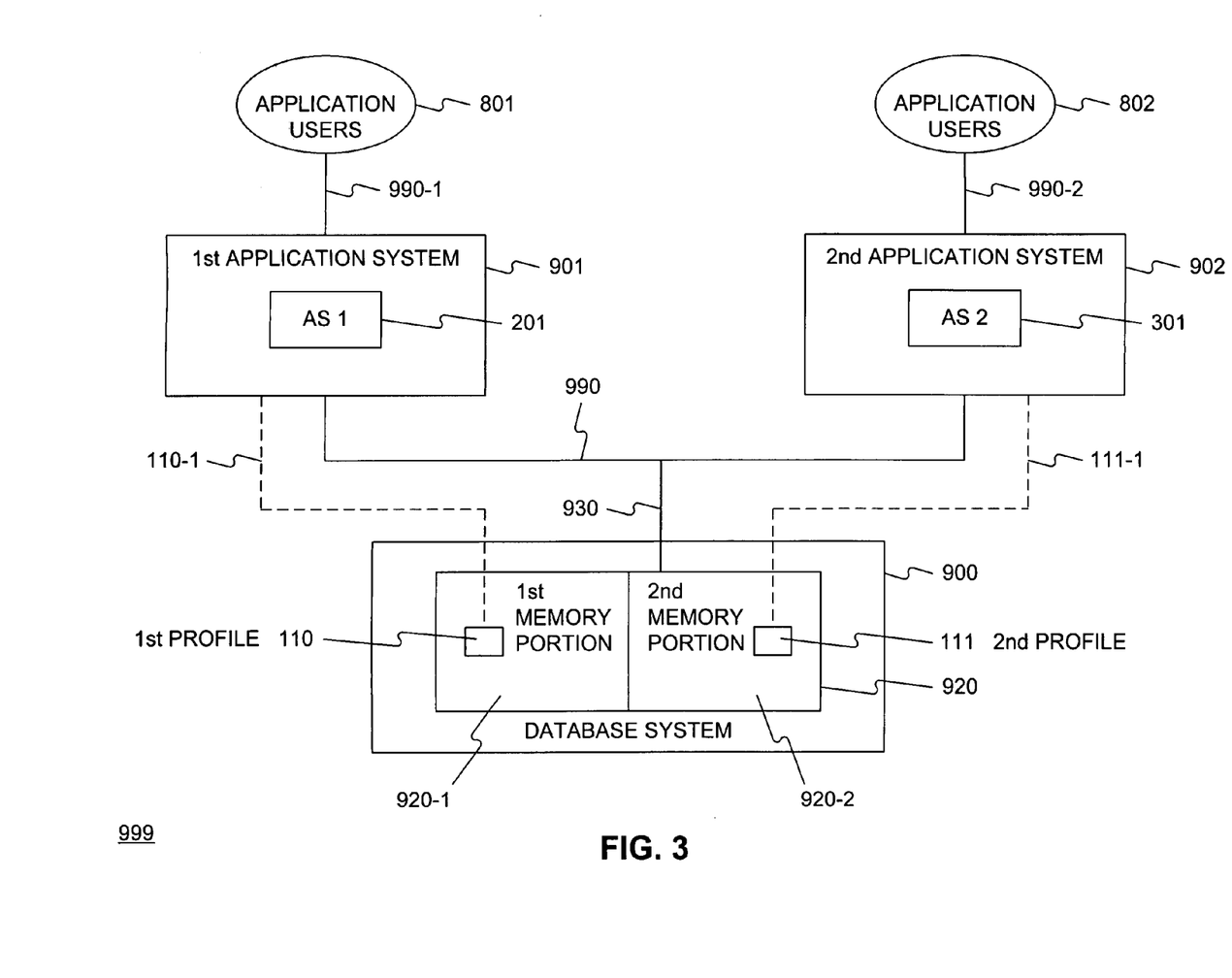
FIG. 3 illustrates a detailed view of the preferred embodiment of the computer system.

FIG. 3 illustrates a detailed view of the preferred embodiment of computer system 999. Computer system 999 comprises at least first application system 901 and second application system 902 as well as database system 900. First application system 901 is running at least one application service out of plurality 201 of application services (labeled AS1), and second application system 902 is running at least one application service out of plurality 301 of application services (labeled AS2).

At least one user out of a first plurality of application users 801 can use application services from AS1 by connecting to first application system 901 via at least one front end computer (not shown). The front end computer can be, for example, a PC, a laptop computer, a web server or the like.

Likewise, at least one user out of a second plurality of application users 802 can use application services from AS2 by connecting to second application system 902 via at least one front end computer (not shown). For convenience of explanation, the connections 990-1 from plurality 801 to first application system 901 and 990-2 from plurality 802 to second application system 902, are illustrated as part of network 990 and stand for connections to the front end computers (not shown). An application user can use the same front-end computer to access both application systems (901, 902). It is not necessary for the invention that each application user corresponds to a different person, rather one person can be assigned to multiple application users of multiple application systems.

Preferably, memory 920 of database system 900 has at least a first memory portion 920-1 and a second memory portion 920-2. The memory portions are disjunctive. That is, changes in first memory portion 920-1 have no impact on second memory portion 920-2 and vice versa. Database system 900 stores at least a first assignment of first predetermined profile 110 to first memory portion 920-1 and stores at least a second assignment of second predetermined profile 111 to second memory portion 920-2. Preferably, first profile 110 and second profile 111, each is unique and refers to first and second application systems (901, 902), respectively. This reference is illustrated by dashed lines 110-1 and 111-1.

When an application user launches an application service in one of the application systems 901 or 902, the application system (that is executing the service) accesses database system 900. In case that an application service from AS1 is launched, first application system 901 accesses first memory portion 920-1 of database system 900 through profile 110. Likewise, in case that an application service from AS2 is launched, second application system 902 accesses second memory portion 920-2 of the same database system 900 through profile 111.

For convenience of explanation, profiles 110 and 111 can be considered as users of database system 900, where the database user is the application system (901, 902) that refers (110-1, 111-1) to the corresponding profile (110, 111). This architecture routes a large number of application users through one profile to database system 900, thus keeping the load of the database system low. It is not necessary for the invention that only one profile is assigned to each application system. In case of increasing the number of profiles for an application system, the load of the database system is increased compared to the load of the application systems—especially when running multiple application systems in connection with the same database system. Typically one application system can comprise multiple application server computers to balance the load on multiple processors. Therefore, the application system scales with additional hardware that is added to the system. Especially, when running multiple application systems in connection with the same database system, load of the database system is no longer a critical factor, either. The usage of parallel database servers helps to improve the scalability of the database system and gives further way to the single database approach described in the present invention.

Figure 4:
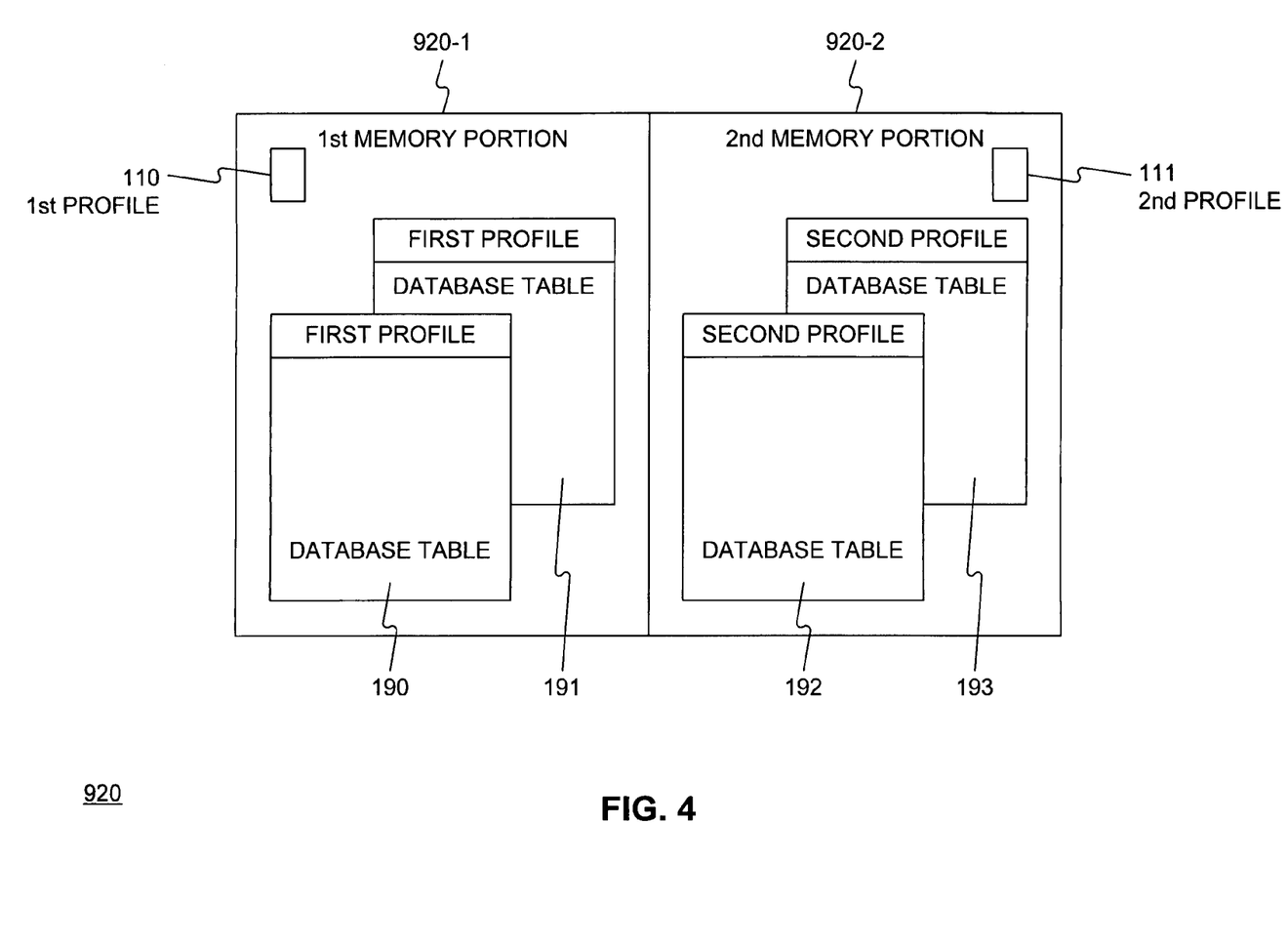
FIG. 4 illustrates database tables in the memory of a database system of the present invention.

FIG. 4 illustrates database tables 190-193 in memory 920 of database system 900 according to the present invention. Tables 190, 191 are stored in first memory portion 920-1 and tables 192, 193 are stored in second memory portion 920-2. Profiles 110 and 111 are assigned to memory portions 920-1 and 920-2, respectively. This indicates that only first application system 901 can access first memory portion 920-1 and only second application system 902 can access second memory portion 920-2. Each table comprises in its table header the information about the profiles (and therefore, indirectly about the application systems) that can access the table. Sometimes, different application systems need access to the same information. For example, in the case of an ERP system that is integrated with a SCM system, preferably, the material master data table of the ERP system is consistent with the material master data table of the SCM system. The different memory portions (e.g. 920-1, 920-2) of database system 900 are disjunctive. The memory portion with the profile for the ERP system does not allow the SCM system to access its material master data table. Therefore, some tables exist in more than one memory portion of the database system. The data consistency of these tables is guaranteed by each application system through network 990 communication (cf. FIG. 3) with another application system and each system consistently updating its own tables in the corresponding memory portion.

Having described the invention as computer system, in the following, the invention is further described as a method.

Figure 5:
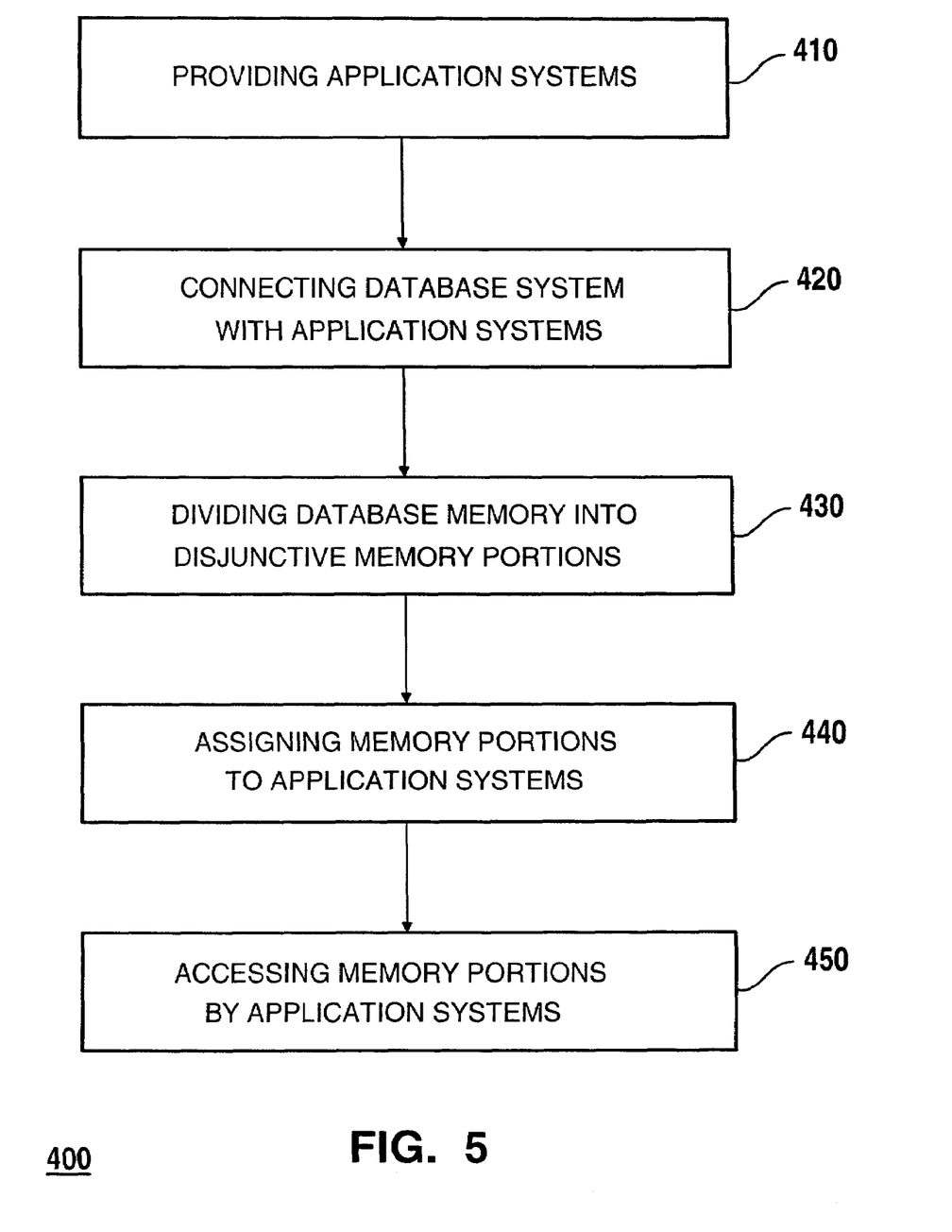
FIG. 5 illustrates a simplified flow chart diagram of a method for multiple application systems to communicate with a single data base system according to the present invention.

FIG. 5 illustrates a simplified flow chart of method 400 for multiple application systems to communicate with a single data base system. Method 400 comprises the steps providing application systems 410, connecting database system with application systems 420, dividing database memory into disjunctive memory portions 430, assigning memory portions to application systems 440 and accessing memory portions by application systems 450.

In step 410, at least a first application system 901 (cf. FIG. 3) and a second application system 902 are provided. Each of the application systems runs at least one application service out of a plurality of application services (201, 301) for a plurality of users (801, 802) of the application system (901, 902).

In step 420, database system 900 gets connected with at least first application system 901 and second application system 902. The connection is established via network 990.

In step 430, memory 920 of data base system 900 is logically divided into at least a first memory portion 920-1 and a second memory portion 920-2. The memory portions are disjunctive. Memory portions 920-1 and 920-2 store tables 190-193 (cf. FIG. 4) of the database system 900.

In step 440, first memory portion 920-1 is assigned to application system 901 and second memory portion 920-2 is assigned to second application system 902. Preferably, the assignments from memory portion to application system are implemented as described in the following:

a) At least one predefined, unique profile 110, 111 of database system 900 is assigned to each memory portion 920-1, 920-2. The assignments can be stored in "memory portion to profile assignment" database matrices, such as matrix 1 (cf. FIG. 6).

Figure 6:
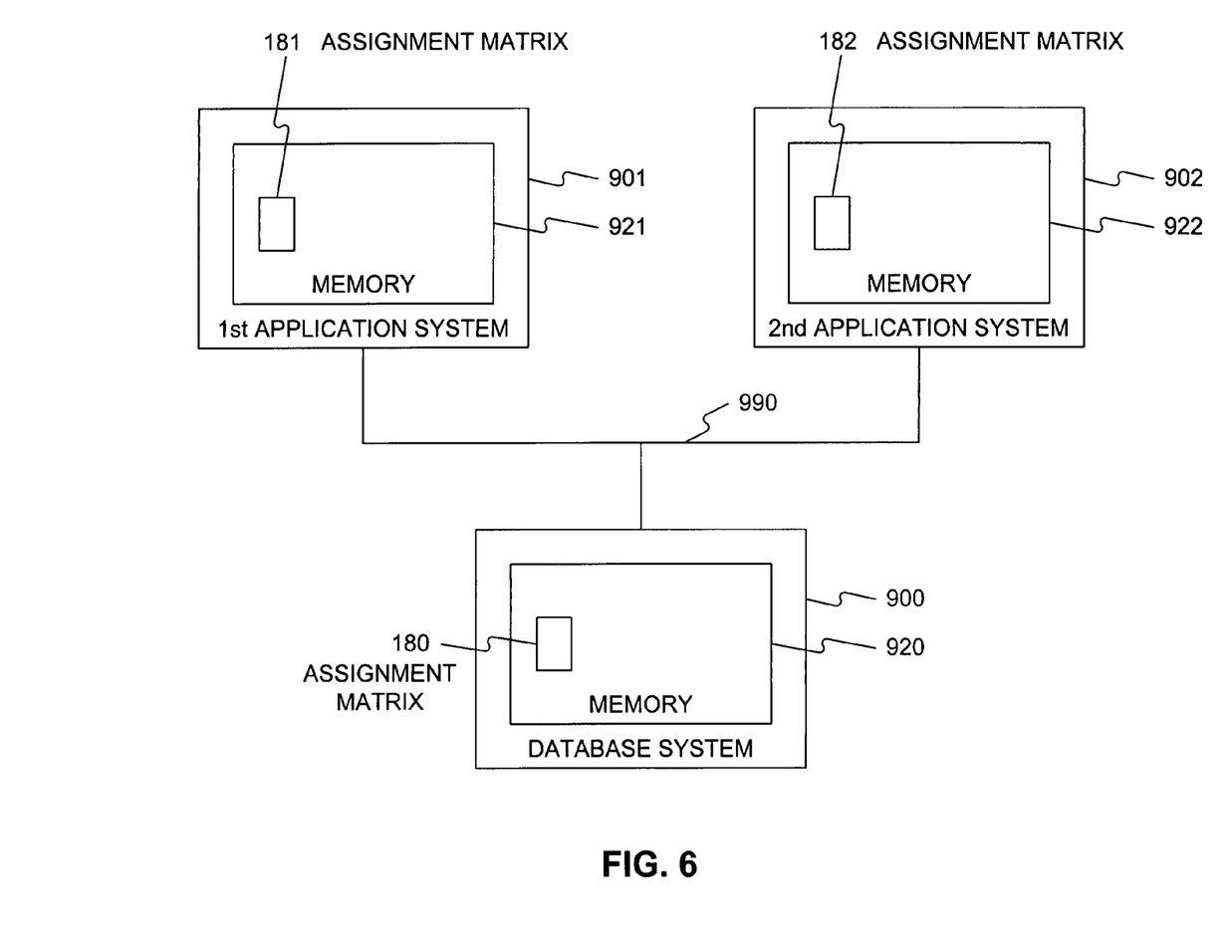
FIG. 6 illustrates a simplified block diagram of the application systems and of the database system with assignment matrices.

| Memory portion | Profile |
| --- | --- |
| 920-1 | 110 |
| 920-1 | — |
| 920-2 | 111 |

Matrix 1: memory portion to profile assignment b) At least one of the predefined profiles 110, 111 of each memory portion 920-1, 920-2 is assigned to the corresponding application system 901, 902, respectively. The assignments can be stored in a "profile to application system assignment" database matrix, such as matrix 2 (cf. FIG. 6).

| Application System | Profile |
| --- | --- |
| 901 | 110 |
| 901 | — |
| 902 | 111 |

Matrix 2: Profile to application system assignment

In step 450, first and second application systems (901, 902) access first and second memory portions (920-1, 920-2), respectively. Preferably, application systems 901, 902 access database system 900 through at least one of their assigned profiles 110, 111. Preferably, the application system accessing the database system triggers any of the database table operations, such as, read, write, copy, modify, insert, append and delete table entries, within the memory portion that is assigned to the application system.

A person of skill in the art can implement profiles 110 and 111 and the assignments of matrices 1 and 2 by using database buffers so that the logical assignment of each application system to the corresponding memory portion remains valid while system 999 is running. Therefore, the assignment has not to be newly established with every access of an application system to the database system.

FIG. 6 illustrates a simplified block diagram of the application systems 901 and 902 and database system 900 with assignment matrices 180, 181 and 182. Matrices 180, 181 and 182 implement the storage of the assignments explained above in connection with matrices 1 and 2.

Conveniently, matrix 180 stores the memory portion to profile assignment (cf. matrix 1); matrix 181 stores the profile to application system assignment for system 901 (cf. matrix 2); and matrix 182 stores the profile to application assignment for system 902 (cf. matrix 2).

The location of matrices 180-182 is not essential for the present invention; conveniently, matrices 180-182 are located as illustrated in FIG. 6. Matrix 180 is stored in memory 920 of system 900; matrix 181 is stored in memory 921 of system 901; matrix 182 is stored in memory 922 of system 902. Persons of skill in the art can locate the matrices at other locations, provided compliance with the above explained function. Preferably, matrices 181-183 are part of computer program product 100/101/102, respectively.

Figure 7:
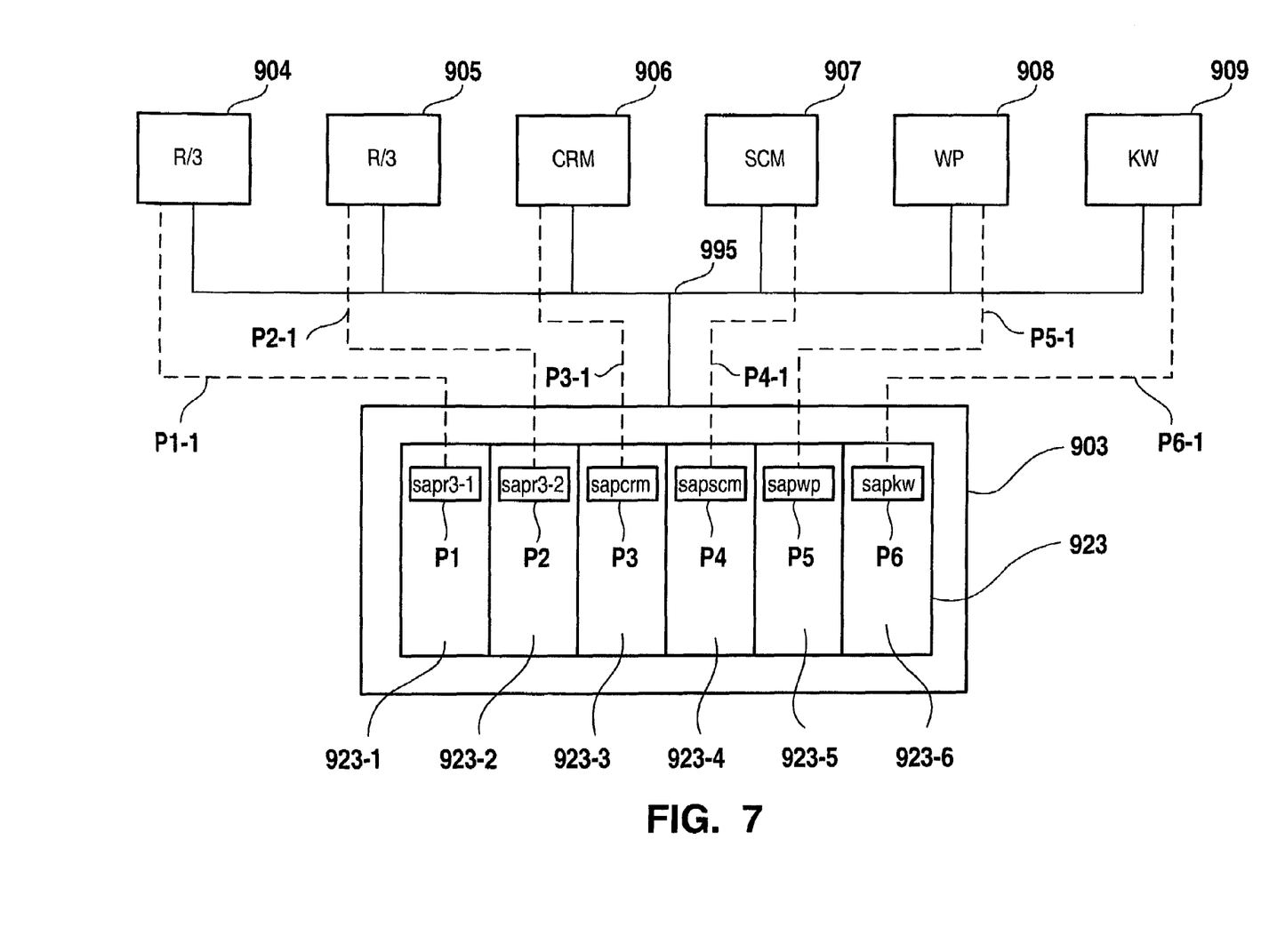
FIG. 7 illustrates a specific, preferred embodiment of the present invention.

FIG. 7 illustrates a specific, preferred embodiment of the present invention by using application systems 904-909 of the SAP product family and database system 903, such as an ORACLE8i system. Two R/3 ERP systems 904/905, one CRM system 906, one SCM system 907, one Workplace (WP) systems 908 and one Knowledge Warehouse (KW) 909 are connected via network 995 to database system 903. Memory 923 of database system 903 is divided into 6 disjunctive memory portions 923-1 to 923-6. Profiles P1-P6 are assigned to memory portions 923-1 to 923-6 according to matrix 3.

| Profile | Profile name | Memory portion |
|---------|--------------|----------------|
| P1 | sapr3-1 | 923-1 |
| P2 | sapr3-2 | 923-2 |
| P3 | sapcrm | 923-3 |
| P4 | sapscm | 923-4 |
| P5 | sapwp | 923-5 |
| P6 | sapkw | 923-6 |

Matrix 3: Profile-to-memory portion assignment

Each profile is assigned to a corresponding application system according to matrix 4.

| Profile | Application system | Assignment |
|---------|--------------------|-----------|
| P1 | 904 | P1-1 |
| P2 | 905 | P2-1 |
| P3 | 906 | P3-1 |
| P4 | 907 | P4-1 |
| P5 | 908 | P5-1 |
| P6 | 909 | P6-1 |

Matrix 4: Profile-to-application system assignment

The assignments are shown as dashed lines. Each application system 904-909 can only access data in the corresponding memory portion of database system 903 through the corresponding profile as defined in matrices 3 and 4. This guarantees data integrity for each application although all application systems 904-909 using the same database system 903. It is possible to upgrade any of the application systems while the other application systems are still running. A consistent backup of all application data on database system 903 can be performed online or offline. The online backup writes any delta in the application data to a database backup system (not shown) as soon as the delta occurs. The point-in-time recovery of this single database system is consistent in case of a total or partial system break-down.

Having described the present invention as method and system, the present invention is now described as data structure (assignment scheme), computer program product and computer readable medium.

An assignment scheme (180-182) that describes the assignment from multiple application systems to a database system is a data structure used in a system landscape (900,901,902, 990). In this system landscape, a first application system 901 provides business application services to a first plurality of application users 801. At least a second application system 902 provides business application services to a second plurality of application users 802. The assignment scheme is characterized by first assignment 180 of database system 900 to provide database services to a first profile 110 and at least a second profile 111 and by further assignments 181, 182. In the assignments 181, 182, first application system 901 is assigned to first profile 110, and second application system 902 is assigned to second profile 111. First and second profiles are assigned to disjunctive memory portions 920-1, 920-2 in memory 920 of database system 900.

The computer program product (100/101/102) of the invention causes a plurality of processors (910-912) to provide an application system to database system assignment scheme (180-182).

A first program portion 100 causes processor 910 of database system 900 to disjunctively partition memory 920 of database system 900 into a first memory portion 920-1 and at least a second memory portion 920-2. First program portion 100 also provides a first database profile 110 and at least a second database profile 111, where each profile can be considered as a database user. The first and second profiles 110, 111 are assigned to the first and second memory portions 920-1, 920-2, respectively.

A second program portion 101 causes processor 911 of first application system 901 to provide at least a first business application service to a first plurality of application users 801 and to use at least first database profile 110 to communicate data from first application system 901 to the database system 900.

At least a third program portion 102 causes processor 912 of at least a second application system 902 to provide at least a second business application service to a second plurality of application users 802 and to use at least second database profile 111 to communicate data from second application system 902 to database system 900.

A further computer program product (101/102) of the present invention causes a processor 911/912 in a computer of an application system 901/902 (that executes at least one business application service) to communicate with database computer 900. Thereby, the computer program product (101/102) causes the processor 911/912 to communicate with database computer 900 by using a unique profile 110/111 that is assigned 180-183 to the application system 901/902. Database computer 900 has memory 920 logically partitioned into a first portion 920-1 and at least a second portion 920-2. The portions are disjunctive, so that first portion 920-1 is reserved for data of the application system (e.g. 901) and second portion 920-2 is reserved for data of at least one further application system that is run by a further computer.

The computer program product of the present invention can be stored on a computer readable medium that has a plurality of sequences of instructions stored thereon. When executed by one or more processors, the processor performs the steps of:

Causing processor 910 of a database system 900 to disjunctively partition a memory 920 of database system 900 into first memory portion 920-1 and at least a second memory portion 920-2 and to provide first database profile 11) and at least a second database profile 111, where the first and second profiles 110, 111 are assigned to the first and second memory portions 920-1, 920-2, respectively.

Causing processor 911 of first application system 901 to provide at least a first business application service to a first plurality of application users 801 and to use at least the first database profile 110 to communicate data from first application system 901 to database system 900.

Causing processor 912 of at least a second application system 902 to provide at least a second business application service to a second plurality of application users 802 and to use at least the second database profile 111 to communicate data from second application system 902 to the database system 900.

| List of Reference Numbers | | |
|---|---|---|
| FIG. 1 | | |
| 1 | ERP application system | |
| 2 | CRM application system | |
| 3 | SCM application system | |
| 4 | ERP DB database system | |
| 5 | CRM DB database system | |
| 6 | SCM DB database system | |
| 10-14 | branches of network | |
| 20 | N ERP USERS, plurality of ERP application users | |
| 21 | N CRM USERS, plurality of CRM application users | |
| 22 | N SCM USERS, plurality of SCM application users | |
| 23-25 | connections from front-end computers to application systems | |
| FIG. 2 | | |
| 999 | computer network system | |
| 900 | computer | |
| 910 | processor | |
| 920 | memory | |
| 930 | bus | |
| 940 | input device | |
| 950 | output device | |
| 960 | user interface | |
| 970 | program carrier | |
| 980 | program signal | |
| 901 | computer | |
| 911 | processor | |
| 921 | memory | |
| 931 | bus | |
| 941 | input device | |
| 951 | output device | |
| 961 | user interface | |
| 971 | program carrier | |
| 981 | program signal | |
| 902 | computer | |
| 912 | processor | |
| 922 | memory | |
| 932 | bus | |
| 942 | input device | |
| 952 | output device | |

-continued

| List of Reference Numbers | | |
|---|---|---|
| 962 | user interface | |
| 971 | program carrier | |
| 981 | program signal | |
| FIG. 3 | | |
| 110 | first profile | |
| 111 | second profile | |
| 110-1, 111-1 | profile to application system assignments (dashed lines) | |
| 201 AS1 | first plurality of application services | |
| 301 AS2 | second plurality of application services | |
| 801 | first plurality of application users | |
| 802 | second plurality of application users | |
| 900 | database system | |
| 901 | first application system | |
| 902 | second application system | |
| 920 | memory of database system | |
| 920-1 | memory portion | |
| 920-2 | memory portion | |
| 930 | bus of system 900 | |
| 990 | network | |
| 990-1 | network branch | |
| 990-2 | network branch | |
| FIG. 4 | | |
| 110 | FIRST PROFILE | |
| 111 | SECOND PROFILE | |
| 190-193 | database tables | |
| 920 | memory of database system | |
| 920-1, 920-2 | memory portions | |
| FIG. 5 | | |
| 400 | method | |
| 410 | PROVIDING APPLICATION SYSTEMS, method step | |
| 420 | CONNECTING DATABASE SYSTEM WITH APPLICATION SYSTEMS | |
| 430 | DIVIDING DATABASE MEMORY INTO DISJUNCTIVE MEMORY PORTIONS | |
| 440 | ASSIGNING MEMORY PORTIONS TO APPLICATION SYSTEMS | |
| 450 | ACCESSING MEMORY PORTIONS BY APPLICATION SYSTEMS | |
| FIG. 6 | | |
| 900 | database system | |
| 901 | first application system | |
| 902 | second application system | |
| 920 | database system memory | |
| 921 | first application system memory | |
| 922 | second application system memory | |
| 180-182 | assignment matrices | |
| 990 | network | |
| FIG. 7 | | |
| 903 | database system | |
| 904, 905 | R/3 application systems | |
| 906 | CRM application system | |
| 907 | SCM application system | |
| 908, 909 | BW application systems | |
| 995 | network | |
| P1 | SAPR3-1, profile | |
| P2 | SAPR3-2, profile | |
| P3 | SAPCRM, profile | |
| P4 | SAPSCM, profile | |
| P5 | SAPBW-1, profile | |
| P6 | SAPBW-2, profile | |
| P1-1-P6-1 | profile to application system assignments (dashed lines) | |
| 923 | database memory | |
| 923-1-923-6 | memory portions | |

The invention claimed is:

1. A computer system comprising at least a first application system and a second application system and a database system, each application system running at least one application service for at least one application system user; said computer system characterized in that:

the database system has at least a first memory portion and a second memory portion, wherein the memory portions are disjunctive;

the database system stores a first assignment of a first profile to the first memory portion and a second assignment of a second profile to the second memory portion, wherein the first profile is uniquely associated with only the first memory portion and the first application system and the second profile is uniquely associated with only the second memory portion and the second application system;

each of the first and second application systems accessing the first memory portion and the second memory portion, respectively, through the corresponding profiles.

2. The computer system of claim 1, wherein the memory portions store tables of the database system.

3. The computer system of claim 1, wherein the database system is a parallel server system.

4. The computer system of claim 1, wherein the database system is a relational database system.

5. The computer system of claim 1, wherein the database system uses shared memory processors.

6. The computer system of claim 5, wherein the database system uses an operating system that creates multiple logical groups of processors.

7. The computer system of claim 6, wherein each group of processors is assigned to one application system.

8. A computer-implemented method for accessing a database system, the method comprising the steps:

providing at least a first application system and a second application system, wherein each application system runs at least one application service for a plurality of users of the application system;

connecting the database system with at least the first application system and the second application system;

dividing a memory of the database system into at least a first memory portion and a second memory portion, both portions being disjunctive;

assigning first and second memory portions to first and second application systems, respectively, using at least two predefined, unique profiles, a first profile uniquely associated with only the first memory portion and the first application system and a second profile uniquely associated with only the second memory portion and the second application system; and     accessing first and second memory portions by the first and second application systems based on the first and second profiles, respectively.

9. The computer-implemented method of claim 8, wherein in the dividing step, the memory portions store tables of the database system.

10. The computer-implemented method of claim 8, wherein in the assigning step, one of the at least two predefined, unique profiles is assigned to each memory portion.

11. The computer-implemented method of claim 10, wherein in the assigning step, each predefined unique profile is assigned to one of the application systems.

12. The computer-implemented method of claim 11, wherein in the accessing step, each application system accesses the database system through at least one of the predefined profiles that are assigned to the application system.

13. The computer-implemented method of claim 8, wherein in the accessing step, accessing is selected from the group of read, write, copy, modify, insert, append and delete.

14. A computer-readable medium storing a computer program product thereon, the computer program product characterized in that:

a first program portion causes a processor of a database system to disjunctively partition a memory of the database system into a first memory portion and a second memory portion and to provide a first database profile and a second database profile, wherein the first profile is uniquely associated with only the first memory portion and a first application system and the second profile is uniquely associated with only the second memory portion and a second application system;

a second program portion causes a processor of the first application system to provide a first business application service to a first plurality of application users and to use at least the first database profile to communicate data from the first application system to the database system; and     a third program portion causes a processor of the second application system to provide a second business application service to a second plurality of application users and to use at least the second database profile to communicate data from the second application system to the database system.

15. A computer-readable medium having a plurality of sequences of instructions stored thereon which when executed by one or more processors, perform the steps of:

causing a processor of a database system to disjunctively partition a memory of the database system into a first memory portion and a second memory portion and to provide a first database profile and a second database profile, where the first and second database profiles are unique and are each uniquely assigned to one of the first and second memory portions, respectively;

causing a processor of a first application system to provide at least a first business application service to a first plurality of application users and to use at least the first database profile to communicate data from the first application system to the database system through the first memory portion; and     causing a processor of at least a second application system to provide at least a second business application service to a second plurality of application users and to use at least the second database profile to communicate data from the second application system to the database system through the second memory portion.

\* \* \* \* \*